United States Patent [19]
Naruse et al.

[11] Patent Number: 5,914,187
[45] Date of Patent: Jun. 22, 1999

[54] CERAMIC STRUCTURAL BODY

[75] Inventors: Kazuya Naruse; Satoshi Ohno; Koji Shimato, all of Gifu; Hiroshi Okazoe; Seiki Iwahiro, both of Saitama, all of Japan

[73] Assignees: Ibiden Co., Ltd., Gifu; Nissan Diesel Motor Co., Ltd., Saitama, both of Japan

[21] Appl. No.: 08/894,793

[22] PCT Filed: Jan. 12, 1996

[86] PCT No.: PCT/JP96/00042

§ 371 Date: Sep. 9, 1997

§ 102(e) Date: Sep. 9, 1997

[87] PCT Pub. No.: WO97/25203

PCT Pub. Date: Jul. 17, 1997

[51] Int. Cl.⁶ ........................................................ B32B 9/00
[52] U.S. Cl. ........................... 428/327; 428/116; 428/117; 428/119; 428/188; 428/690; 428/913; 502/439; 156/89; 55/282; 55/523
[58] Field of Search ................................... 428/116, 117, 428/119, 188, 327, 913; 502/439; 156/89; 55/282, 523

[56] References Cited

FOREIGN PATENT DOCUMENTS

| | | |
|---|---|---|
| 0398130 | 5/1990 | European Pat. Off. . |
| 60-65219 | 4/1985 | Japan . |
| 1-63715 | 4/1989 | Japan . |
| 5115721 | 5/1993 | Japan . |
| 7-54643 | 2/1995 | Japan . |
| 07138533 | 5/1995 | Japan . |
| 7-59885 | 6/1995 | Japan . |

OTHER PUBLICATIONS

English language abstract in connection with Japanese Patent No. 7–54643, Feb. 28, 1995.

English language abstract in connection with Japanese Patent No. 7–59885, Jun. 28, 1995.

English language abstract in connection with Japanese Patent No. 07–138533, May 30, 1995.

English language abstract in connection with Japanese Patent No. 5–115721, May 14, 1993.

English language abstract in connection with Japanese Patent No.60–65219, Apr. 15 1985.

English language abstract in connection with Japanese Utility Model Laid–Open No. 1–63715, Apr. 24, 1989.

International Search Report in connection with International Application No. PCT/JP96/00042 (in Japanese and English language), Jan. 12, 1996.

*Primary Examiner*—William Krynski
*Assistant Examiner*—Abraham Bahta
*Attorney, Agent, or Firm*—Greenblum & Bernstein P.L.C.

[57] ABSTRACT

Ceramic structural body having improved material properties of a sealing member, such as adhesion properties at room temperature and high temperature, and having an improved durability. The ceramic structural body comprises an assembly of plural united ceramic members each having a plurality of through-holes arranged side by side along a longitudinal direction, in which end faces at either side of these through-holes are closed in a checkered pattern so as to have a reverse relation of open and close between gas inlet side and gas outlet side and adjacent through-holes are permeable to each other through porous partition walls. A plurality of the ceramic members are integrally adhered by interposing a sealing member of an elastic material comprising at least inorganic fibers, an inorganic binder, an organic binder and inorganic particles and mutually bonded three-dimensionally intersected organic fibers and inorganic particles through the inorganic binder and organic binder between the mutual ceramic members.

20 Claims, 5 Drawing Sheets

CERAMIC STRUCTURAL BODY

TECHNICAL FIELD

This invention relates to a ceramic structural body, and more particularly it proposes an improvement in the structure of the ceramic structural body made by piercing a plurality of through-holes in parallel to each other along a longitudinal direction of a member, such as a ceramic honeycomb structural body, monolithic structural body and the like.

DISCUSSION OF BACKGROUND INFORMATION

In general, the ceramic structural body such as a ceramic honeycomb structural body and the like formed by piercing a plurality of through-holes in the longitudinal direction of the member in parallel to each other is used as a filter for purifying exhaust gas discharged from vehicles, factories and the like.

This ceramic structural body has such an end face that the open-close condition of the through-holes shows a checkered pattern (the state that adjacent through-holes are alternately in the open-close condition). That is, these through-holes are sealed at either only one of their end faces, and adjacent through-holes are opened or closed from each other to form the checkered pattern. Therefore, when one through-hole is opened at one end face, the other end face is sealed, while the adjacent through-hole thereto is sealed at one end face and opened at the other end face.

Moreover, the ceramic structural body is such a porous body that when a gas to be treated is flown from either one end face of each of the above through-holes, the treated gas enters into an adjacent through-hole passing through porous partition walls on the way toward the other end face and then discharges out from such other end face. That is, the ceramic structural body is made possible to mutually pass the gas through the partition wall separating the through-holes. Therefore, the gas to be treated easily passes into the other through-hole in the structural body, so that the gas passes through different through-holes at the inlet side and outlet side.

Therefore, when the exhaust gas is passed through the above ceramic structural body, particle substances (particulate) in the exhaust gas are caught and purified in the partition wall portion while passing the exhaust gas flown from one-side end face through the partition wall toward the outlet port. With the purifying action of the exhaust gas, the ceramic structural body degrades the pass of the gas because the particulate is collected and accumulated in the partition wall at the inlet port side to gradually create clogging. Therefore, the ceramic structural body requires a treatment for periodically burning and removing the particulate accumulated on the partition wall, which results in the clogging, by a heating mechanism such as burner, heater or the like (hereinafter simply referred to as "regeneration").

The above ceramic structural body, however, causes non-uniform temperature distribution inside the structural body due to local heat generation accompanied with nonuniform heating process and abnormal burning of particulate, thermal shock given by sudden temperature change of exhaust gas and the like so as to bring about the action of thermal stress. As a result, the above ceramic structural body has encountered such problems that crack generation and hence molten loss are invited and finally led to breakage so as to impede collection of particulate.

On the contrary, hitherto, as means for solving the above problems, there has been proposed, for example, a method for decreasing thermal stress acting on a ceramic structural body by dividing the ceramic structural body into a plurality of ceramic members on the face perpendicular to the axis or the face in parallel with the axis (see JP-A-60-65219). Moreover, there has been proposed a divided ceramic structural body having improved property for sealing the exhaust gas by inserting a non-adhesion sealing member in a gap produced between the mutual ceramic members in this divided-type ceramic structural body (hereinafter referred to as "divided ceramic structural body") (see JU-A-1-63715).

According to the above respective proposals, the divided ceramic structural body can liberate thermal stress observed in a one-piece ceramic structural body owing to the use of the above sealing member.

However, the sealing member is non-adhesive, so that the ceramic members cannot be firmly joined to each other. Therefore, the above divided ceramic structure body according to the conventional technique was required to have a restraint force for uniting these ceramic members to maintain the form of a one-piece structural body. Therefore, as means for giving this restraint force, there has hitherto been used an arrangement of a thermally expansive heat insulator or an application of the thermally expansive heat insulator as an inner sealing member.

However, the above non-adhesion sealing member and the thermally expansive heat insulator are poor in the durability to heat in the regeneration and repetition of oscillation generated from an internal-combustion engine. Therefore, the sealing member proceeds the degradation of volume shrinkage and strength to lower the sealing property, while the thermally expansive heat insulator has a problem to rapidly lower the restoring force after volume expansion.

Therefore, the above divided ceramic structural body has lost force for supporting a plurality of ceramic members constituting this structural body, and decomposed and dispersed by the pressure of the exhaust gas. Moreover, even if a reinforcing member is arranged at an end face at an outlet side of the gas, it is difficult to prevent the degradation of the sealing member, and it is desired to improve the durability.

Particularly, in order to form a large-size divided ceramic structural body, a larger restraint force is required, the combination of the conventional non-adhesion sealing member and thermally expansive heat insulator cannot deal with from the beginning, so that a structural body is not obtained that can withstand stress to be practically useful.

Under the above circumstances, the inventors have previously proposed "EXHAUST GAS PURIFYING APPARATUS AND STRUCTURAL BODY THEREOF" with the use of a sealing member consisting of ceramic fiber, silicon carbide powder and inorganic binder by improving the sealing member constituting the divided ceramic structural body as means for overcoming the problems inherent to the above conventional technique (see Japanese Patent Application No. 5-204242).

According to this proposal, a plurality of ceramic members are joined to each other through such a sealing member, so that it is possible to improve the durability of the divided ceramic structural body to a certain extent.

However, the sealing member tends to easily cause migration (phenomenon of moving a binder with drying and removal of a solvent) when it is filled and cured between the mutual ceramic members. Therefore, the seal layer formed by curing the sealing member becomes brittle.

That is, the inorganic binder constituting the above sealing member acts to firmly join the ceramic member to the seal layer and to join an intersect point of three-dimensionally crossed ceramic fibers as an important element for developing stress buffering function of the seal layer. However, the inorganic binder moves from the inside of the seal layer to the joint face with the ceramic member through the migration produced in the course of drying and curing, whereby the joint force at the intersect point is decreased, and hence the strength of the ceramic structural body itself is lowered, so that the desired durability could not be satisfied.

Furthermore, the silicon carbide powder constituting the sealing member also moves with the above migration to bring about the lowering and nonuniformity of thermal conductivity, which results in the lowering of the regeneration efficiency of the ceramic structural body.

On the contrary, there is considered a method of improving the durability of the structural body by controlling the migration. However, this method takes a long time for drying and curing the sealing member ant undesirably degrades the productivity.

As mentioned above, the conventional divided ceramic structural body still leaves room for improvement with respect to durability and the like as a ceramic structural body.

SUMMARY OF THE INVENTION

The invention is made for solving the above-described various problems inherent to the conventional technique, and its main object is to improve the durability of the ceramic structural body.

Another object of the invention is to improve material properties such as adhesion properties of a sealing member at room temperature and high temperature and the like.

The other object of the invention is to improve the adhesion property and thermal conductivity of the sealing member at room temperature and high temperature while maintaining elasticity and heat resistance to thereby simultaneously improve both durability and regeneration efficiency of the divided ceramic structural body.

The inventors have made further studies to realize the above objects. As a result, the inventors have found an invention having the construction mentioned below.

That is, the invention lies in a ceramic structural body comprising an assembly of plural united ceramic members each having a plurality of through-holes arranged side by side along a longitudinal direction, in which end faces at either side of these through-holes are closed in a checkered pattern so as to have a reverse relation of open and close between gas inlet side and gas outlet side and adjacent through-holes are permeable to each other through porous partition walls, characterized in that a plurality of the ceramic members are integrally adhered by interposing a sealing member of an elastic material consisting of at least inorganic fibers, an inorganic binder, an organic binder and inorganic particles and mutually bonded three-dimensionally intersected organic fibers and inorganic particles through the inorganic binder and organic binder between the mutual ceramic members.

The sealing member is desirable to be an elastic material formed by using ceramic fiber as the inorganic fiber, using colloidal sol as the inorganic binder, using polysaccharide as the organic binder, and using at lease one inorganic powder or whisker selected from carbides and nitrides as the inorganic particle, and mixing them each other. Particularly, the sealing member is desirable to be an elastic material formed by using at least one ceramic fiber selected from silica-alumina, mullite, alumina and silica as the inorganic fiber, using at least one colloidal sol selected from silica sol and alumina sol as the inorganic binder, using at least one polysaccharide selected from polyvinyl alcohol, methyl cellulose, ethyl cellulose and carboxymethyl cellulose as the organic binder and using at least one inorganic powder or whisker selected from silicon carbide, silicon nitride and boron nitride as the inorganic particle. More particularly, it is desirable to be an elastic material consisting of silica-alumina ceramic fiber, silica sol, carboxymethyl cellulose and silicon carbide powder.

Concretely, the above sealing member is favorable to have the following composition.

①  In the ceramic fiber, it is desirable that the content of silica-alumina fiber is 10~70 wt %, preferably 10~40 wt %, more preferably 20~30 wt % as a solid content. Because, when the content is less than 10 wt %, the effect as an elastic body lowers, while when it exceeds 70 wt %, the thermal conductivity lowers and also the effect as an elastic body lowers.

②  In the colloidal sol, it is desirable that the content of silica sol is 1~30 wt %, preferably 1~15 wt %, more preferably 5~9 wt % as a solid content. Because, when the content is less than 1 wt %, the adhesion strength lowers, while when it exceeds 30 wt %, the thermal conductivity lowers.

③  In the polysaccharide, it is desirable that the content of carboxymethyl cellulose is 0.1~5.0 wt %, preferably 0.2~1.0 wt %, more preferably 0.4~0.6 wt % as a solid content. Because, when the content is less than 0.1 wt %, migration cannot be controlled, while when it exceeds 5.0 wt %, the organic binder is burnt out by thermal hysteresis of high temperature, and the strength lowers.

④  In the inorganic powder or whisker, it is desirable that the content of silicon carbide powder is 3~80 wt %, preferably 10~60 wt %, more preferably 20~40 wt % as a solid content. Because, when the content is less than 3 wt %, the thermal conductivity lowers, while when it exceeds 80 wt %, the adhesion strength at high temperature lowers.

⑤  In the ceramic fiber constituting the sealing member, the silica-alumina ceramic fiber is desirable to have a shot content of 1~10 wt %, preferably 1~5 wt %, more preferably 1~3 wt %, and a fiber length of 0.1~100 mm, preferably 0.1~50 mm, more preferably 0.1~20 mm. Because, when the shot content is less than 1 wt %, the production is difficult, while when the shot content exceeds 10 wt %, a wall of a member to be sealed (ceramic member) is damaged. On the other hand, when the fiber length is less than 0.1 mm, an elastic structural body can not be formed, while when it exceeds 100 mm, the fiber becomes fluffy to make dispersion of the inorganic particles worse, and also the thickness of the sealing member cannot be made thin to bring about the lowering of thermal conductivity between the members to be sealed.

⑥  In the inorganic powder or whisker constituting the sealing member, it is desirable that the particle size of the silicon carbide powder is 0.01~100 μm, preferably 0.1~15 μm, more preferably 0.1~10 μm. Because, when the particle size exceeds 100 μm, the adhesion force (strength) and thermal conductivity lower, while when it is less than 0.01 μm, the cost becomes undesirably high.

Figure 1:
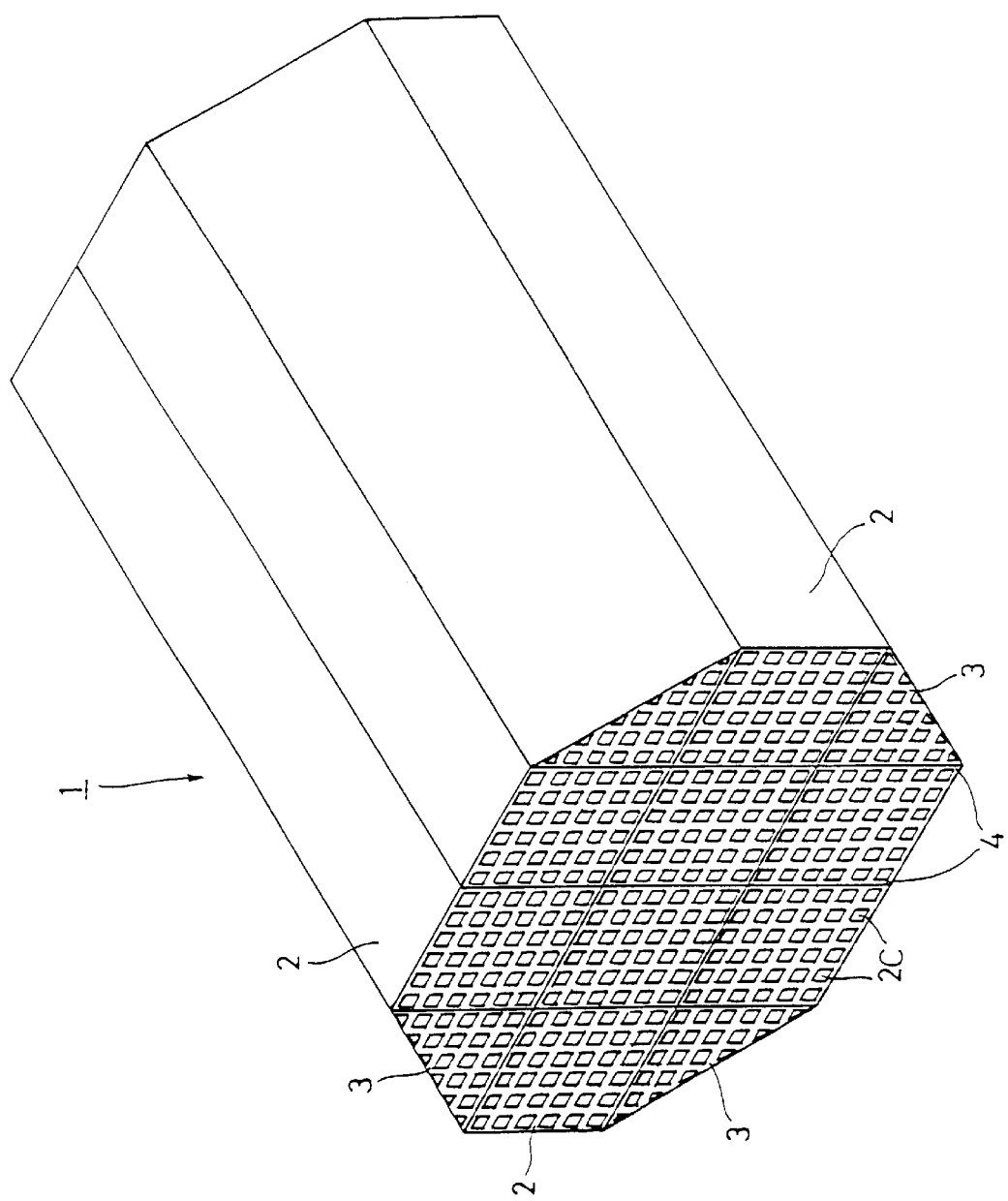
FIG. 1 is a perspective view illustrating a filter for an exhaust gas purifying apparatus with the use of the ceramic structure body according to the invention.

Reference numeral 1 is a filter for an exhaust gas purifying apparatus, numerals 2 and 3 ceramic members, numeral 4 a sealing member, and numeral 5 a heat insulator.

BEST MODE FOR CARRYING OUT THE INVENTION

An essential feature of the ceramic structural body according to the invention lies in a construction of a sealing member capable of integrally uniting a plurality of ceramic members.

Concretely, there is a first point of improving the durability of the ceramic structural body by entangling the inorganic fibers and organic binder constituting the sealing member with each other to improve the uniformity of the structure and the joining property at a low temperature region. That is, it is an essential point that it is possible to maintain the three-dimensional bond of inorganic fibers and fixation of inorganic particles to inorganic fibers by adopting an organic binder capable of drying and curing at an early stage to control the occurrence of migration as seen in the conventional sealing member.

Thus, the sealing member may be an elastic material having a uniform structure and excellent adhesion property, elasticity and strength. As a result, the ceramic structural body formed by integrally uniting a plurality of ceramic members with such sealing members has a sufficient adhesion strength without giving any restraint force from an external restraining member and can simultaneously liberate thermal stress.

A second point lies in that the adhesion strength at a high temperature region can be maintained by the entangling effect of the inorganic fibers and the inorganic binder constructing the sealing member. The reason is considered due to the fact that the organic binder is calcined and removed at the high temperature region, but the inorganic binder is rendered into ceramic by heating, and this ceramic exists in intersect points of the inorganic fibers and contributes to joining between the inorganic fibers and between the inorganic fiber and the ceramic member. On the other hand, the inorganic binder can hold the adhesion strength even at the low temperature region through drying and heating.

Therefore, the ceramic structural body having excellent adhesion strengths at low temperature region and high temperature region can be formed by a synergistic action of the organic binder with the above effect of entangling the ceramic fibers such as silica-alumina with the inorganic binder such as silica sol.

A third point lies in that the inorganic particles are existent on the surface of the inorganic fiber and the surface of the inorganic binder or the inside thereof to improve the thermal conductivity of the ceramic structural body.

Particularly, inorganic particles such as nitride and carbide, can considerably improve the thermal conductivity owing to a high thermal conductivity property inherent to the nitride and carbide.

Therefore, the sealing member containing the inorganic particles has excellent thermal conductivity and can effectively prevent the breakage of the ceramic structural body without causing temperature peak phenomenon at the regeneration while filling gaps produced in the combination of plural ceramic members when the sealing member is used, for example, as a filter for an exhaust gas purifying apparatus. Moreover, the occurrence of cracks by heat cycle can be reduced, and the edge portion of the outer periphery of the filter can be heated in a relatively short time to improve the regeneration efficiency.

The ceramic structural body according to the invention will be described in detail as follows.

When the ceramic structural body is used as a filter for an exhaust gas purifying apparatus, the sealing member constituting the structural body is necessary to have elasticity, thermal conductivity, joining property, strength and the like in addition to heat resistance. When the elasticity is excellent, even if thermal stress is applied to the filter by heating, this thermal stress can surely be liberated. Further, when the thermal conductivity is excellent, heat of a heating element is immediately and evenly conducted to the whole of the structural body, and the temperature difference in the exhaust gas purifying apparatus is minimized. Moreover, when the joining property and strength are excellent, the adhesion property between the adjacent united ceramic members becomes excellent, and the durability of the ceramic structural body itself becomes excellent.

The invention lies in that the construction of the sealing member exhibiting the above properties is an elastic structural body formed by using the inorganic fibers, inorganic binder, organic binder and inorganic particles and mutually bonding the three-dimensionally intersected inorganic fibers and inorganic particles through the inorganic binder and organic binder.

As the inorganic fiber, there are silica-alumina ceramic fiber, mullite fiber, alumina fiber and silica fiber. Particularly, the silica-alumina ceramic fiber is desirable because it is excellent in the elasticity and shows a function of absorbing thermal stress.

As the inorganic binder, colloidal sol is desirable, which includes, for example, alumina sol and silica sol. Particularly, silica sol is desirable, which acts as an adhesive (inorganic binder). This silica sol is easily available and suitable as an adhesive at high temperature region because it is easily changed into $SiO_2$ by firing, and is excellent in the insulating property.

As the organic binder, a hydrophilic organic high polymer is desirable, and particularly polysaccharide is more preferable. Concretely, there are polyvinyl alcohol, methyl cellulose, ethyl cellulose, carboxymethyl cellulose and the like. Among them, carboxymethyl cellulose is particularly desirable because it secures the fluidity at the time of assembling (contributes to improvement of workability) and shows an excellent adhesion property at room temperature region.

As the inorganic particle, inorganic particles of carbide and/or nitride are desirable, such as silicon carbide, silicon nitride and boron nitride. These carbide and nitride are very large in the thermal conductivity and contribute to the improvement of the thermal conductivity by existing on the surface of ceramic fiber and the surface and inside of colloidal sol. For example, the thermal conductivity of silicon carbide is 0.19 cal/cm•sec•°C., and the thermal conductivity of boron nitride is 0.136 cal/cm•sec•°C., while the thermal conductivity of alumina is about 0.08 cal/ cm·sec·°C., so that it is understood that the carbide and nitride are particularly effective for improving the thermal conductivity.

Among the inorganic particles of these carbide and nitride, silicon carbide is particularly optimum in view of the thermal conductivity. Boron nitride is lower than silicon carbide in the affinity with ceramic fiber. That is, silicon carbide possesses all of adhesion property, heat resistance, water resistance and thermal conductivity.

An embodiment of using the ceramic structural body according to the invention in a filter for an exhaust gas purifying apparatus attached to a diesel engine will be described in detail with reference to FIGS. 1~5 below.

Figure 2:
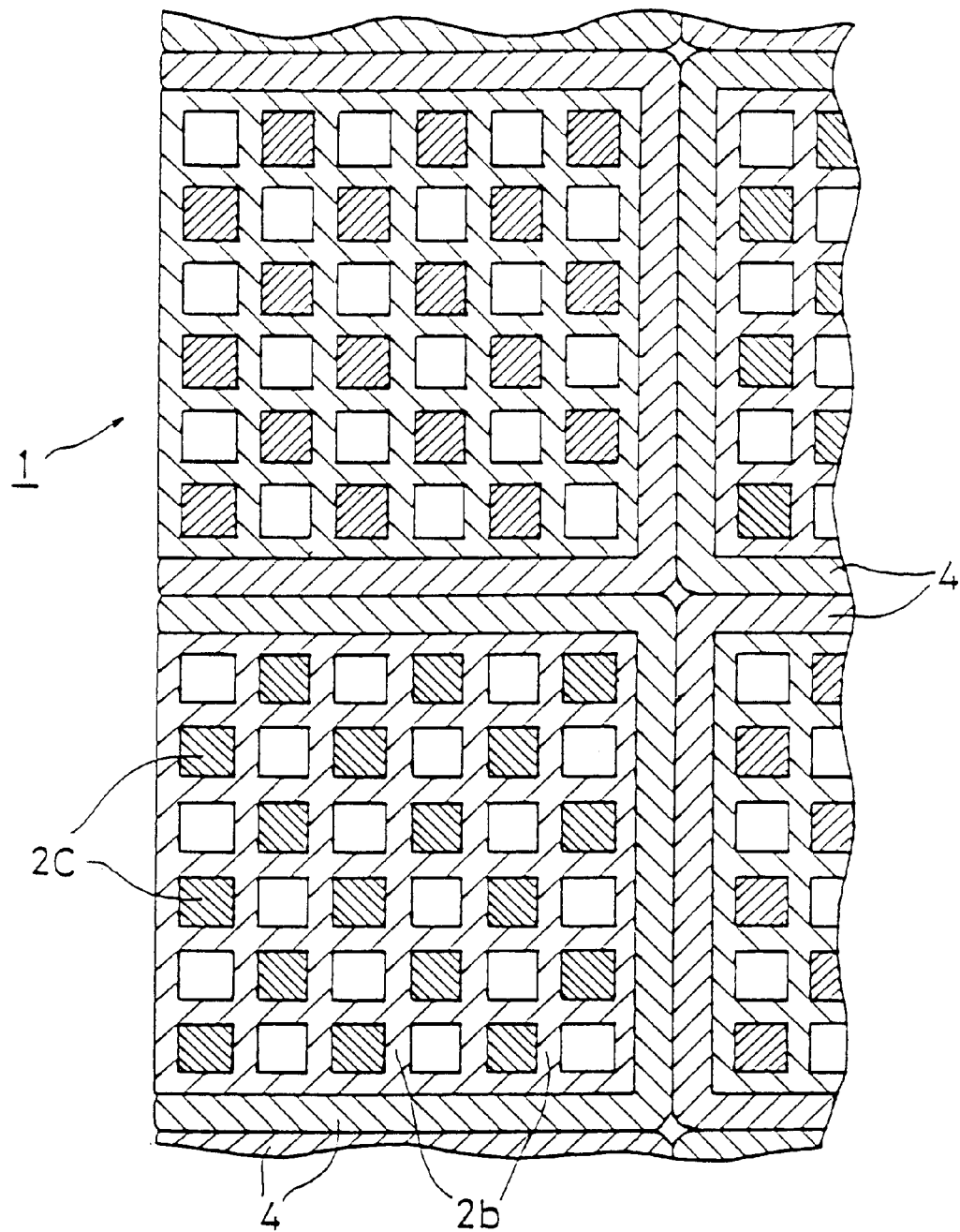
FIG. 2 is a partially enlarged sectional view of the filter for the exhaust gas purifying apparatus with the use of the ceramic structure body according to the invention.

FIG. 1 shows a filter 1 for an exhaust gas purifying apparatus using the ceramic structural body according to the invention, and FIG. 2 is a partially enlarged section view of the filter. In these figures, the filter 1 for the exhaust gas purifying apparatus is constructed by integrally adhering eight prismatic ceramic members 2 and four ceramic members 3 of a right angle equilaterally triangle in section through sealing members 4 (1.5~3.0 mm in thickness) of an elastic material interposed between the mutual members.

Figure 3:
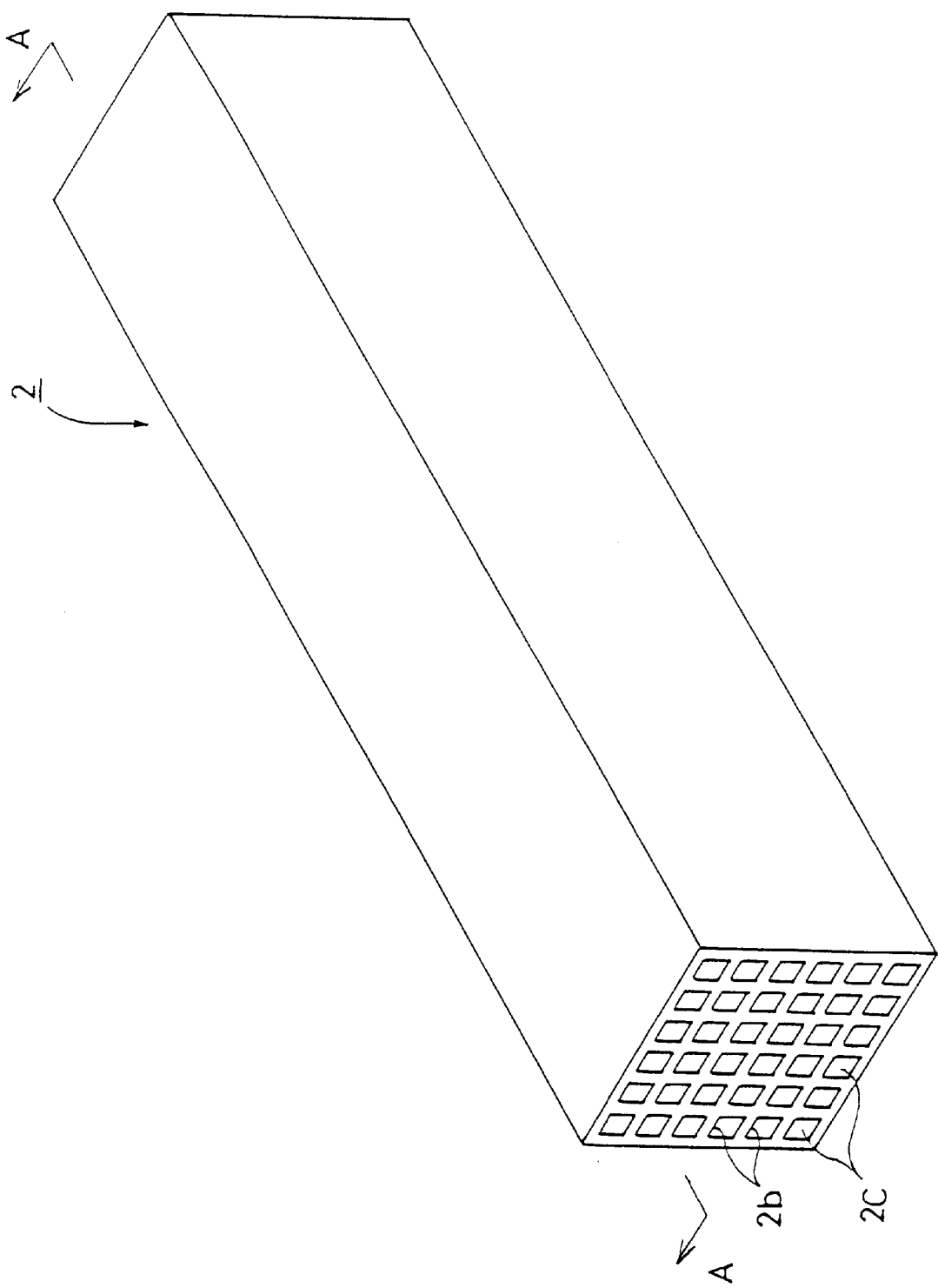
FIG. 3 is a perspective view of a ceramic member in the filter for the exhaust gas purifying apparatus according to the invention.
Figure 4:
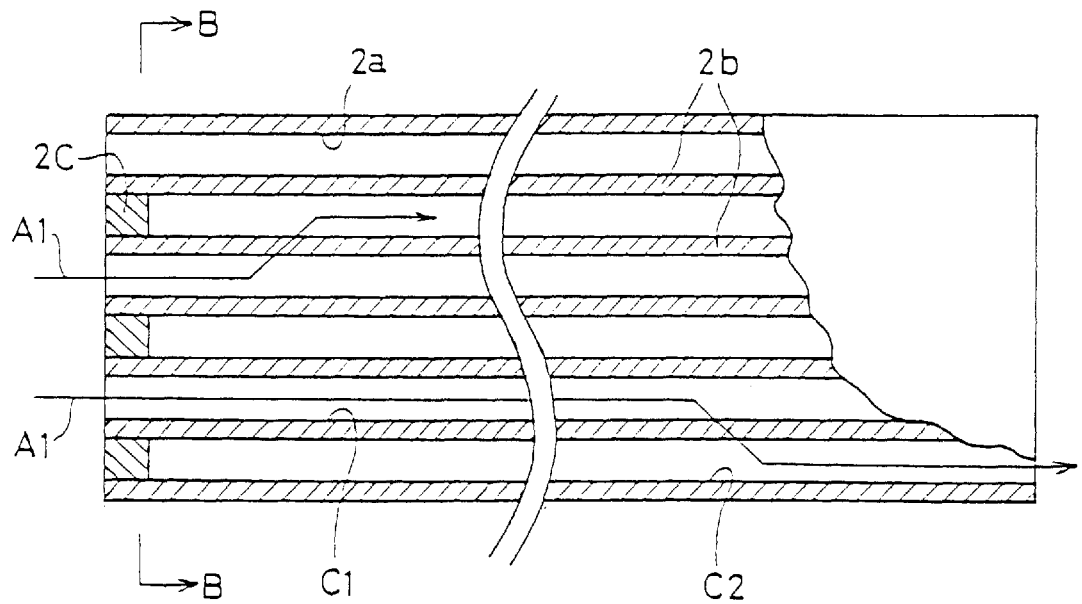
FIG. 4 is a partially cutaway enlarged sectional view taken along line A—A of FIG. 3.
Figure 5:
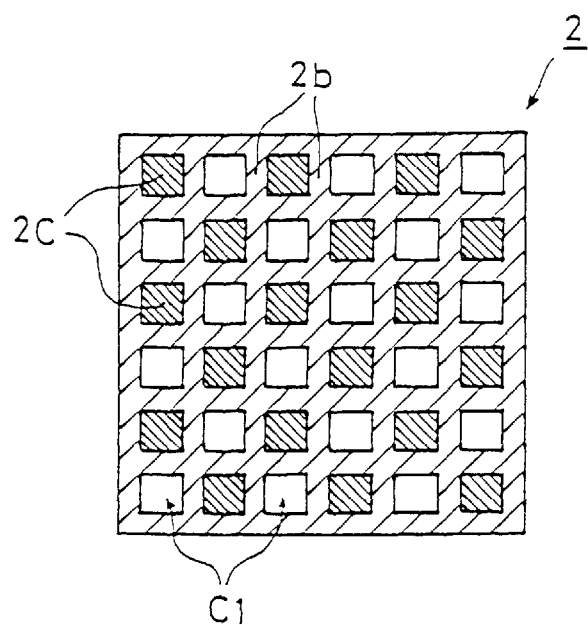
FIG. 5 is an enlarged sectional view taken along line B—B of FIG. 4.

FIGS. 3~5 show the ceramic member 2 constituting a part of the filter for the exhaust gas purifying apparatus. In these figures, through-holes 2a of an approximately square shape in section are regularly pierced in the ceramic member 2 of a prismatic shape (33 mm×33 mm×150 mm) along its axial direction. These through-holes 2a are separated from each other with porous partition walls 2b of 0.3 mm in thickness. Either one end of exhaust gas inlet side and outlet side of each of the through-holes 2a is sealed with a sealing piece 2c of a porous sintered body in a checkered pattern. As a result, cells C1, C2 are formed so as to open only to either one of the inlet side and outlet side of the ceramic member 2. Moreover, an oxidation catalyst comprised of platinum element, other metal element or an oxide thereof may be carried on the partition walls 2b of the cells C1, C2 because an ignition temperature of the particulate lowers by the carrying. Moreover, the ceramic member 3 has the same construction as the ceramic member 2 except that the cross section is right angle equilateral triangle. In case of the ceramic members 2, 3 constituting the filter 1 for the exhaust gas purifying apparatus of this embodiment, there are set a mean pore diameter to 10 μm, a porosity to 43%, a thickness of a cell wall to 0.3 mm, and a cell pitch to 1.8 mm, respectively.

In this embodiment, the filter 1 for the exhaust gas purifying apparatus having the aforementioned structure is prepared to conduct the evaluation of performances in the filter.

EXAMPLE 1

(1) 51.5 wt % of α-type silicon carbide powder and 22 wt % of β-type silicon carbide powder were wet mixed, and the resulting mixture was added and kneaded with 6.5 wt % of an organic binder (methyl cellulose) and 20 wt % of water. Next, small amounts of a plasticizer and a lubricant were added and kneaded, which was extrusion-molded to obtain a honeycomb green shaped body.

(2) Next, this green shaped body was dried by using a microwave drier. Thereafter, through-holes 2a of the shaped body were sealed with a paste for the formation of a sealing piece 2c made of a porous sintered body, and then the paste for the sealing piece 2c was dried by using the drier again. After the dried body was degreased at 400° C., it was further fired in an argon atmosphere at 2200° C. to obtain porous honeycomb ceramic members 2, 3.

(3) A sealing member was prepared from a paste obtained by mixing and kneading 23.3 wt % of ceramic fiber (alumina silicate ceramic fiber, shot content: 3 wt %, fiber length: 0.1~100 mm), 30.2 wt % of silicon carbide powder of 0.3 μm in mean particle size, 7 wt % of silica sol ($SiO_2$ conversion amount of sol: 30%) as an inorganic binder, 0.5 wt % of carboxymethyl cellulose as an organic binder and 39 wt % of water.

(4) The above sealing member was filled between the mutual ceramic members 2, 3, dried and cured at 50~100° C.×1 hour to prepare a filter 1 integrally joining the ceramic members 2, 3 with the sealing member 4 as shown in FIG. 1.

Moreover, the above sealing member could be dried and cured without causing migration.

EXAMPLE 2

This example is fundamentally the same as Example 1, but the following sealing member was used instead of that of Example 1.

It was used by mixing and kneading 25 wt % of ceramic fiber (mullite fiber, shot content: 5 wt %, fiber length: 0.1~100 mm), 30 wt % of silicon nitride powder of 1.0 μm in mean particle size, 7 wt % of alumina sol (conversion amount of alumina sol: 20%) as an inorganic binder, 0.5 wt % of polyvinyl alcohol as an organic binder and 37.5 wt % of alcohol.

Moreover, the above sealing member could be dried and cured without causing migration.

EXAMPLE 3

This example is fundamentally the same as Example 1, but the following sealing member was used instead of that of Example 1.

It was used by mixing and kneading 23 wt % of ceramic fiber (alumina fiber, shot content: 4 wt %, fiber length: 0.1~100 mm), 35 wt % of boron nitride powder of 1 μm in mean particle size, 8 wt % of alumina sol (conversion amount of alumina sol: 20%) as an inorganic binder 0.5 wt % of ethyl cellulose as an organic binder and 35.5 wt % of acetone.

Moreover, the above sealing member could be dried and cured without causing migration.

Comparative Example

This example is fundamentally the same as Example 1, but the following conventional sealing member was used instead of the sealing member in Example 1 and further an outermost peripheral portion of the filter 1 was covered with a heat insulator (63 wt % of ceramic fiber, 7 wt % of α-sepiolite, 20 wt % of unexpanded vermiculite and 10 wt % of an organic binder).

It was used in form of paste or sheet by mixing and kneading 44.2 wt % of ceramic fiber (alumina-silica fiber, shot content: 2.7 wt %, fiber length: 30~100 mm), 13.3 wt % of silica sol as an inorganic binder and 42.5 wt % of water.

Moreover, the above sealing member caused migration at the time of drying and curing.

The evaluation of performances with respect to the filters 1 prepared in Examples 1~3 and Comparative Example was carried out by the following method.

[Measurement of adhesion strength at initial stage and after heat cycle]

Figure 6:
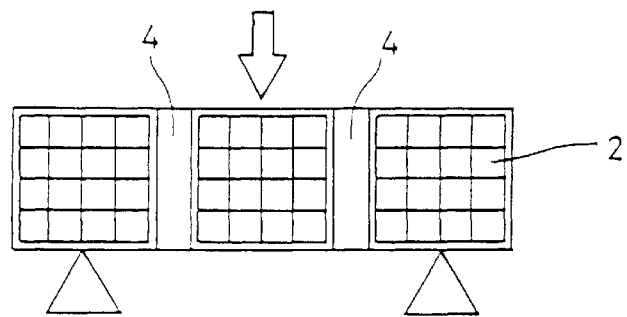
FIG. 6 is a view illustrating a test for the measurement of adhesion strength.

As shown in FIG. 6, a test piece corresponding to three ceramic members was cut from the filter 1 and a load was applied to a central ceramic member to measure a load causing the peeling. Moreover, since quick heating and quenching from room temperature to 900° C. were anticipated in actual use, the test piece was subjected to a heat cycle test of room temperature ~900° C.

Table 1 shows results measured on the adhesion strength at an initial stage and after heat cycle (after 100 cycles) between the mutual ceramic members 2, 3 constituting the filter 1. Moreover, the reason why the strength after heat cycle is improved is assumed due to the sintering action of silica by heating at 900° C.

TABLE 1

|  | Adhesion strength at initial stage | Adhesion strength after heat cycle |
| --- | --- | --- |
| Example 1 | 4.6 kg/cm$^2$ | 7.6 kg/cm$^2$ |
| Example 2 | 4.5 kg/cm$^2$ | 5.3 kg/cm$^2$ |
| Example 3 | 4.3 kg/cm$^2$ | 5.6 kg/cm$^2$ |
| Comparative Example 1 | 2.3 kg/cm$^2$ | 0.76 kg/cm$^2$ |

[Measurement of thermal conductivity]

Figure 7:
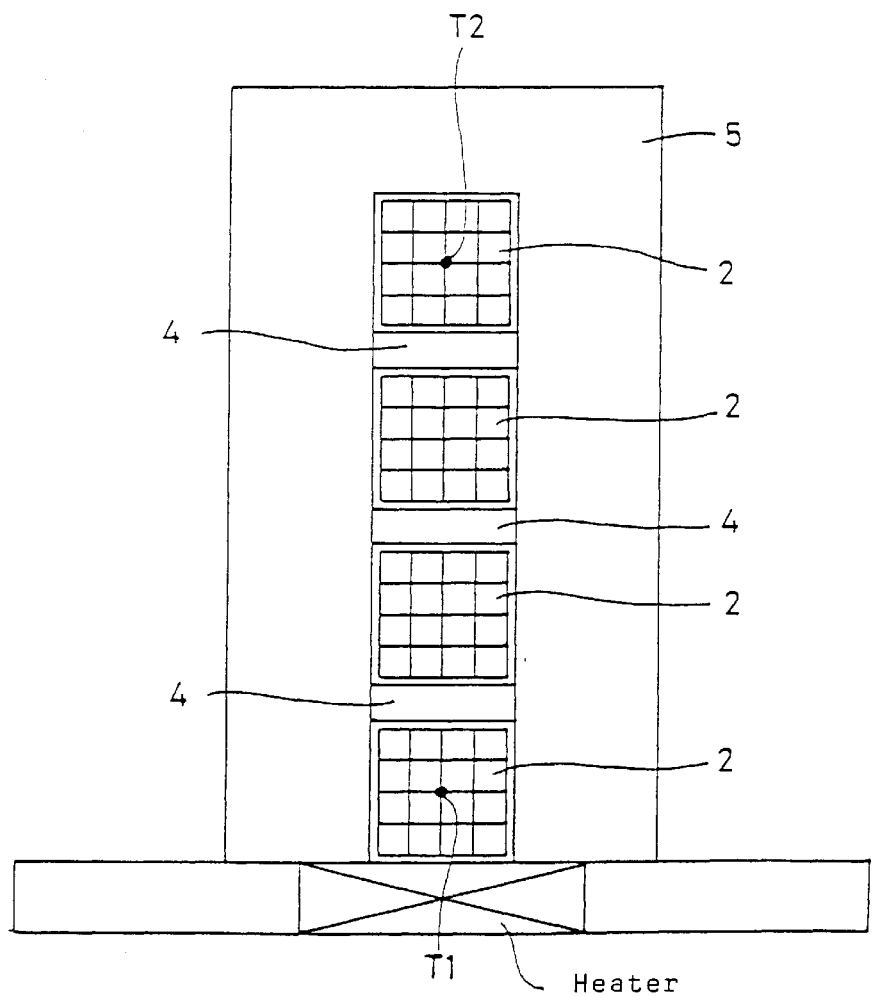
FIG. 7 is a view illustrating a test for the measurement of thermal conductivity.

As shown in FIG. 7, a test piece corresponding to four ceramic members was cut out and covered on its outer periphery with a heat insulator and placed on a heater 6 to conduct heating for 20 minutes. A temperature difference between T1 and T2 was measured.

Table 2 shows results measured on the temperature difference between T1 and T2 shown in FIG. 7 with respect to Examples 1~3 and Comparative Example.

TABLE 2

|  | T1 − T2 temperature difference |
| --- | --- |
| Example 1 | 55° C. |
| Example 2 | 65° C. |
| Example 3 | 70° C. |
| Comparative Example | 180° C. |

As seen from the above results, the filter using the ceramic structural body according to the invention has considerably high adhesion strength even at both high temperature and room temperature, and is excellent in the heat cycle property, so that it was confirmed that the durability as a filter is excellent.

And also, this ceramic structural body is excellent in the thermal conductivity, so that the occurrence of peak temperature in the ceramic member located inside the filter can be reduced and also the temperature rising time of the ceramic structural body located at the edge portion can be shortened and hence the improvement of the regeneration efficiency can simultaneously be realized.

Moreover, the construction of the filter 1 applying the ceramic structural body according to the invention is not limited to those described in the above examples, and can be changed to the following construction. For example, (a) The number of combined ceramic members is not necessarily 12 as in the examples, but any optional number is possible. In this case, it is naturally possible to properly combine ceramic members having different sizes, forms and the like. Moreover, the adoption of the construction made by combining plural ceramic members is particularly advantageous in the manufacture of a filter for a large-sized exhaust gas purifying apparatus. purifying apparatus.

(b) The filter 1 of the above examples can be grasped to be at a state of dividing the so-called one large filter into the plural parts along the axial direction. Therefore, there are considered, for example, the state of dividing the filter into a doughnut, the state of dividing the filter in a direction perpendicular to the axial direction and the like.

(c) It is naturally possible to adopt not only the honeycomb-shaped ceramic members 2, 3 as shown in the above examples but also three-dimensional network structure, foam structure, noodle structure, fiber structure and the like. Moreover, the material for the ceramic members 2, 3 may naturally be selected from any other than silicon carbide.

(d) In case of constructing the filter 1, a heater may be arranged between the ceramic members 2, 3. In this case, the heater is not limited to be a metallic wire. That is, the heater may be prepared by a method such as metal metallizing, printing of conductor paste, sputtering or the like.

Although the above examples are described with respect to the case of applying the ceramic structural body according to the invention to the filter for an exhaust gas purifying apparatus attached to the diesel engine, this ceramic structural body can be used, for example, as a heat exchanger member or a filter for filtering high temperature fluid or high temperature vapor in addition to the filter for the exhaust gas purifying apparatus.

INDUSTRIAL APPLICABILITY

As mentioned above, the ceramic structural body according to the invention is excellent in the adhesion strength regardless of temperature, and further excellent in the thermal conductivity, so that if it is applied to a filter for an exhaust gas purifying apparatus, it is possible to realize the shortening of regeneration time and the improvement of regeneration efficiency and durability.

We claim:

1. A ceramic structural body comprising:
   an assembly of a plurality of ceramic members;
   each of said plurality of ceramic members comprising:
      a plurality of through-holes arranged side-by-side along a longitudinal direction between opposing end faces comprising a gas inlet side and a gas outlet side;
      through-holes in said opposing end face on said gas inlet side being closed in a checkered pattern and through-holes in said opposing end face on said gas outlet side being closed in a reverse relation so that through-holes that are open on said gas inlet side are closed on said gas outlet side; and
      adjacent through-holes being permeable to each other through porous partition walls; and
   sealing member integrally adhering said plurality of ceramic members, said sealing member being interposed between adjacent ceramic members, and being composed of an elastic material comprising inorganic fibers, inorganic binder, organic binder and inorganic particles.

2. The ceramic structural body according to claim 1, wherein said inorganic fibers comprise ceramic fibers, said inorganic binder comprises colloidal sol, said organic binder comprises polysaccharide, and said inorganic particles comprise at least one member selected from the group consisting of carbide and nitride inorganic powders or whiskers.

3. The ceramic structural body according to claim 2, wherein said ceramic fibers are at least one member selected from the group consisting of silica-alumina, mullite, alumina and silica.

4. The ceramic structural body according to claim 2, wherein said colloidal sol is at least one member selected from the group consisting of silica sol and alumina sol.

5. The ceramic structural body according to claim 2, wherein said polysaccharide is at least one member selected from the group consisting of polyvinyl alcohol, methyl cellulose, ethyl cellulose and carboxymethyl cellulose.

6. The ceramic structural body according to claim 2, wherein said at least one member selected from the group consisting of carbide and nitride inorganic powders or whiskers is at least one member selected from the group consisting of silicon carbide, silicon nitride and boron nitride.

7. The ceramic structural body according to claim 2, wherein said sealing member comprises silica-alumina ceramic fiber, silica sol, carboxymethyl cellulose and silicon carbide powder.

8. The ceramic structural body according to claim 7, wherein said sealing member comprises about 10 to 70 wt % of silica-alumina ceramic fiber, about 1 to 30 wt % silica sol, about 0.1 to 5.0 wt % carboxymethyl cellulose, and about 3 to 80 wt %, based upon total solid weight.

9. The ceramic structural body according to claim 7, wherein said silica-alumina ceramic fiber has a shot content of about 1 to 10 wt % and a fiber length of about 1 to 100 mm.

10. The ceramic structural body according to claim 7, wherein the silicon carbide powder has a particle size of about 0.01 to 100 μm.

11. A ceramic structural body comprising:

an assembly of a plurality of ceramic members;

each of said plurality of ceramic members comprising:
  a plurality of through-holes arranged side-by-side along a longitudinal direction between opposing end faces comprising a gas inlet side and a gas outlet side;
  through-holes in said opposing end face on said gas inlet side being closed in a checkered pattern and through-holes in said opposing end face on said gas outlet side being closed in a reverse relation so that through-holes that are open on said gas inlet side are closed on said gas outlet side; and
  adjacent through-holes being permeable to each other through porous partition walls; and sealing member integrally adhering said plurality of ceramic members, said sealing member being interposed between adjacent ceramic members, and being composed of an elastic material comprising inorganic fibers, inorganic binder, organic binder and inorganic particles, and said organic binder and inorganic binder bonding said inorganic particles to said inorganic fibers.

12. The ceramic structural body according to claim 11, wherein said inorganic fibers comprise ceramic fibers, said inorganic binder comprises colloidal sol, said organic binder comprises polysaccharide, and said inorganic particles comprise at least one member selected from the group consisting of carbide and nitride inorganic powders or whiskers.

13. The ceramic structural body according to claim 11, wherein said ceramic fibers comprise at least one member selected from the group consisting of silica-alumina, mullite, alumina and silica.

14. The ceramic structural body according to claim 11, wherein said colloidal sol is at least one member selected from the group consisting of silica sol and alumina sol.

15. The ceramic structural body according to claim 11, wherein said polysaccharide is at least one member selected from the group consisting of polyvinyl alcohol, methyl cellulose, ethyl cellulose and carboxymethyl cellulose.

16. The ceramic structural body according to claim 12, wherein said at least one member selected from the group consisting of carbide and nitride inorganic powders or whiskers is at least one member selected from the group consisting of silicon carbide, silicon nitride and boron nitride.

17. The ceramic structural body according to claim 12, wherein said sealing member comprises silica-alumina ceramic fiber, silica sol, carboxymethyl cellulose and silicon carbide powder.

18. The ceramic structural body according to claim 17, wherein said sealing member comprises about 10 to 70 wt % of silica-alumina ceramic fiber, about 1 to 30 wt % silica sol, about 0.1 to 5.0 wt % carboxymethyl cellulose, and about 3 to 80 wt %, based upon total solid weight.

19. The ceramic structural body according to claim 17, wherein said silica-alumina ceramic fiber has a shot content of about 1 to 10 wt % and a fiber length of about 1 to 100 mm.

20. The ceramic structural body according to claim 17, wherein the silicon carbide powder has a particle size of about 0.01 to 100 μm.

* * * * *

UNITED STATES PATENT AND TRADEMARK OFFICE
CERTIFICATE OF CORRECTION

PATENT NO. : 5,914,187
DATED : June 22, 1999
INVENTOR(S) : K. NARUSE et al.

It is certified that error appears in the above-identified patent and that said Letters Patent is hereby corrected as shown below:

On the Title Page Item [56], References Cited, the following U.S. PATENT DOCUMENTS were omitted and should be inserted:

| | | | |
|---|---|---|---|
| 4746570 | 5/1988 | Suzuki et al. | 428/327 |
| 5629067 | 5/1997 | Kotani et al. | 428/116 |
| 5766393 | 6/1998 | Nishimura et al. | 156/89 |

Signed and Sealed this

Twenty-seventh Day of March, 2001

Attest:

NICHOLAS P. GODICI

Attesting Officer

Acting Director of the United States Patent and Trademark Office